G. W. CONNER.
FUSE OR CUT-OUT.
APPLICATION FILED APR. 3, 1919.
1,396,255.
Patented Nov. 8, 1921.
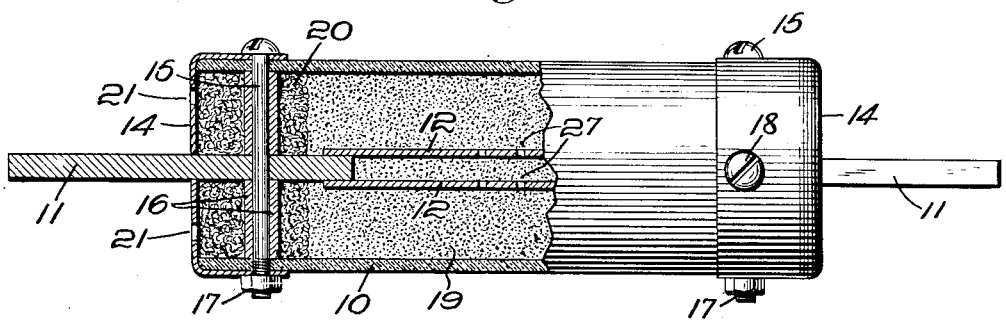
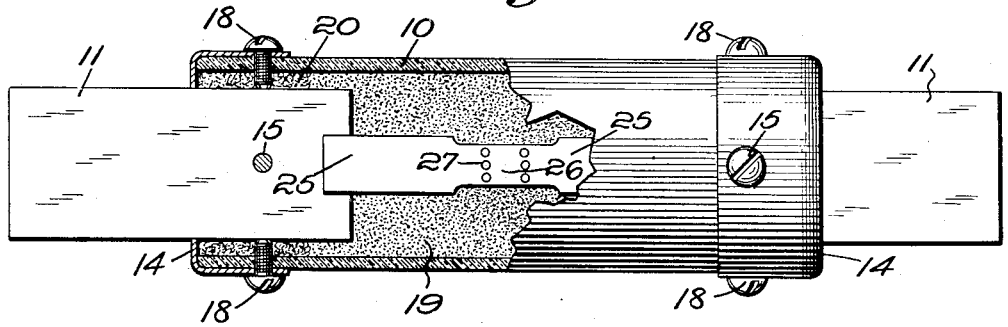
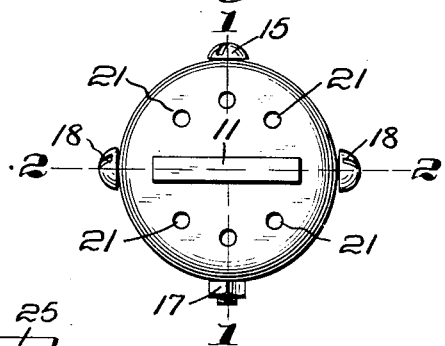
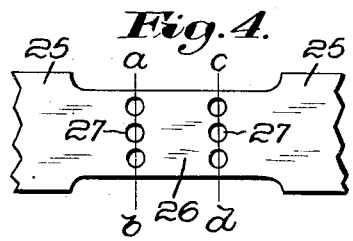
Inventor:
George W. Conner,
by Emery, Booth, Janney & Varney
Attys.

UNITED STATES PATENT OFFICE.

GEORGE W. CONNER, OF ROSLINDALE, MASSACHUSETTS.

FUSE OR CUT-OUT.

1,396,255.  Specification of Letters Patent.  Patented Nov. 8, 1921.

Application filed April 3, 1919. Serial No. 287,219.

*To all whom it may concern:*

Be it known that I, GEORGE W. CONNER, a citizen of the United States, and a resident of Roslindale, county of Suffolk, and Commonwealth of Massachusetts, have invented an Improvement in Fuses or Cut-Outs, of which the following description, in connection with the accompanying drawings, is a specification, like characters on the drawings representing like parts.

This invention relates to improvements in fuses or cut-outs for electric circuits, the object being the production of a cut-out having a simple but efficient construction.

The invention will be best understood by reference to the following description, when taken in connection with the accompanying illustration of one specific embodiment thereof, while its scope will be more particularly pointed out in the appended claims.

Referring to the drawings, Figure 1 is an elevation in partial central longitudinal section on the line 1—1 in Fig. 3, showing a cut-out embodying one form of the invention;

Fig. 2 is a partial sectional plan taken on the line 2—2 in Fig. 3;

Fig. 3 is an end elevation of the cut-out shown in Figs. 1 and 2; and,

Fig. 4 is an enlarged detail in plan, showing a portion of the fusible link.

Referring to the drawings, I have therein shown for illustrative purposes one embodiment of the invention having a tubular shell 10 of suitable insulating material, such, for example, as vulcanized fiber. This is provided at each end with a flat, terminal blade 11, of copper or other conductive material, each of the blades having an exteriorly projecting portion and an interiorly projecting portion. The inner ends of the blades are electrically connected by a fusible link or connection, herein in the form of upper and lower strips 12 of fusible metal with their ends soldered to the blades providing a fusible conductor having a centrally reduced and predetermined cross-sectional area.

Herein each end of the tubular insulating shell is covered by a preferably metallic cap piece 14, the end of which is slotted to receive the blade 11, and the sides of which fit the ends of the exterior walls of the tubular shell 10.

Combined with the cap pieces, there is provided fastening means for rigidly supporting the blade portions within the tubular shell. For this purpose the side walls of each cap piece are perforated at diametrically opposite points to receive the screw 15, which latter passes through apertures in the tubular shell registering with the apertures in the cap piece, and also through a similar aperture formed in the interior portion of the blade 11 (Figs. 1 and 2).

Encircling the screw 15, and located between each side of the blade and the adjacent interior walls of the shell there are also provided tubular bushings or spacing members 16. When the parts are assembled as illustrated in Fig. 1 and the nut 17 applied to the threaded projecting end of the screw 15, the entire structure may be rigidly clamped together, the blades being thereupon clamped between the spacing members and the shell between the spacing members and the metallic cap.

In addition to the clamping screw 15, which passes entirely through the cap and the blade and binds them to the shell, additional fastening devices may be employed, such as the screws 18—18, which pass through the sides of the cap (Fig. 2) and are threaded through the tubular shell engaging the edges of the blade and herein acting to center the blade and prevent it from moving sidewise about the binding screw 15.

The described cut-out may be provided with the usual powdered filling 19, of any suitable material, such as slaked lime, for the purpose of dissipating the heat and diffusing the gases formed on the blowing of the fuse 12, such powdered filling being herein shown as held between relatively thin bodies or layers of asbestos 20, the latter resting against the bushing 16. The cap pieces 14 are also provided with openings 21 to allow for the escape of the gases after they have filtered through the powdered filling and the asbestos layer.

While the described construction provides a highly rigid and mechanically efficient support and connection for the terminal blades and one which is dependent only to a small degree upon the structural strength of the tubular shell, advantage can be taken of this construction to adapt it to any misalinement of the connections to which the blades are fastened. By slightly loosening the binding screws 15 before the blades are fastened to their stationary connections on the switchboard or other support, sufficient flexibility or play may be allowed the parts so that they will adjust themselves to any ordinary mis-alinement of those connections.

In order to provide a fusible link which is adapted to fuse at a certain predetermined point, I have so shaped the link members 12 (Figs. 2 and 4) that they have adjacent each terminal blade 11 a portion 25 of substantial extent, having a relatively large cross sectional area with an intermediate portion 26 also of substantial extent of a relatively smaller cross sectional area, which concentrates the heating effect upon the mid portion of the link.

The heating effect is then further concentrated upon one or more definite and predetermined points in the reduced portion 26, so that the link will fuse with certainty at those points by one or more sets of perforations 27, each set consisting of one or more perforations of circular or other such shape as will provide converging walls in the link converging toward a transverse plane, such as is indicated by the line $a$—$b$ in Fig. 4, along which there is a minimum cross sectional area with the cross sectional area on either side thereof rapidly increasing in extent.

Thus in the embodiment of the invention shown in Fig. 4, the fusible link is certain to rupture along the line or plane $a$—$b$, not only because the heating effect is concentrated upon the portion 26, but because it is further concentrated along the line $a$—$b$ by the shape of the perforations, the centers of which lie along the same transverse line and produce a minimum cross sectional area which is substantially less than that on either side of the line, and which rapidly increases as the location of the line is departed from.

While the heating effect may be thus doubly concentrated along one transverse plane, herein I have arranged two sets of such perforations 27 in the reduced central portion 26 of each link, one arranged along the transverse plane $a$—$b$ and a second along the transverse plane $c$—$d$, the two being separated so as to leave an intermediate portion of substantial extent. This will cause the link members to fuse along the two planes $a$—$b$ and $c$—$d$ permitting the intermediate portion to drop away and separate from the adjacent portions which remain connected to the terminal blades.

While I have herein shown and described for purposes of illustration one specific embodiment of the invention, it will be understood that the same is submitted for illustrative purposes only and extensive deviations may be made from the form, construction and relative arrangement of the parts, without departing from the spirit thereof.

Claims—

1. In a device of the character described, a shell, a cap having side walls arranged over the end of said shell and an end wall having a slot, a blade extending through said slot and movable relatively to said cap, oppositely located members for engaging the edges of said blade for normally centering it relatively to said shell but permitting adjustment of said blade relatively thereto, means affording a clamping member extending diametrically through both sides of the wall of said cap and through the tube and blade, and oppositely located spacers separate from the elements heretofore enumerated and abutting the blade and interior surface of said shell.

2. In a device of the character described, a tubular shell, a cap having tubular side walls arranged over the end of the shell and an end wall having a slot, a blade extending through said slot and movable relatively to said cap, means for centering said blade and for permitting said blade to be adjusted relatively to said shell, and means for clamping the cap, blade and shell together.

3. In a fuse cartridge, a shell, blades at opposite ends of the shell and normally alined therewith, centering means permitting adjustment of said blades relatively to said shell, and means for clamping said blades to said shell.

4. In a device of the character described, a shell, an end closure for said shell and provided with an opening, a blade extending through said opening into the shell and movable relatively to said closure, means for permitting adjustable centering of said blade and for clamping said blade in position.

5. In a device of the character described, a shell, an end closure for said shell and provided with an opening, a flat sided blade separate from said closure and extending through said opening into said shell, means abutting the edges of said blade for centering it relatively to said shell, and adjustable clamping means abutting the flat sides of the blade for centering it relatively to said shell and clamping it thereto.

6. An inclosed fusible cut-out having terminals, a fusible connecting link having a portion of reduced cross section, the latter being provided with a plurality of separated perforations arranged at different points lengthwise the link and intermediate the terminals to produce therein a plurality of points having a materially reduced cross-sectional area at which fusion may take place.

7. An inclosed fusible cut-out having terminals, a fusible connecting link the latter having a portion of reduced cross section, said portion being provided with a plurality of sets of perforations, the sets being located at different positions longitudinally the link, and the perforations of each set being arranged along a transverse plane.

8. A fusible cut-out having terminals and a fusible connecting link, said link having a portion of reduced cross-section and a drop-out section within said reduced portion.

9. An inclosed fusible cut-out having terminals and a fusible connecting link, said link having the form of a ribbon with an intermediate portion of reduced width, and said intermediate portion being so formed as to provide therein a drop-out section.

10. An inclosed fusible cut-out having flat bars serving as terminals, a plurality of connecting links of fusible material connecting said terminals, said links each having a portion of reduced cross-section and a drop-out section within said reduced portion.

11. As an article of manufacture, a fusible link for cut-outs, said link having the form of a ribbon with an intermediate portion of reduced width and said intermediate portion being so formed as to provide therein a drop-out section.

In testimony whereof I have signed my name to this specification.

GEORGE W. CONNER.